Oct. 6, 1942.    R. E. STORK    2,297,813
CHAIN
Filed July 7, 1939    2 Sheets-Sheet 1
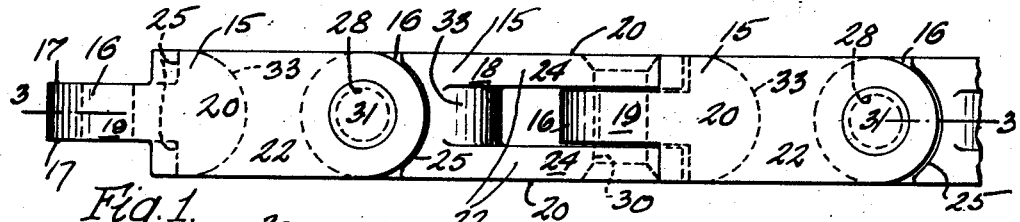
Fig. 1.
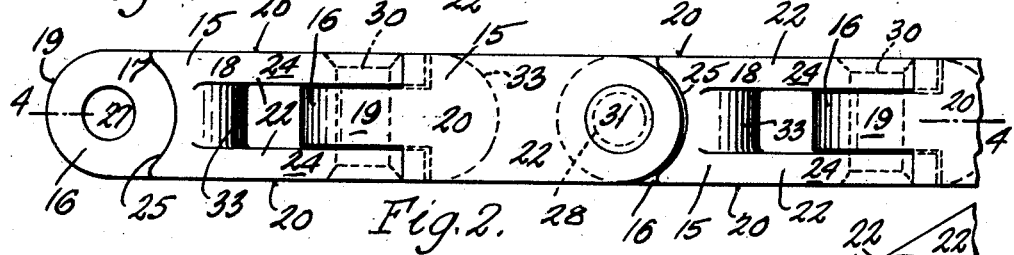
Fig. 2.
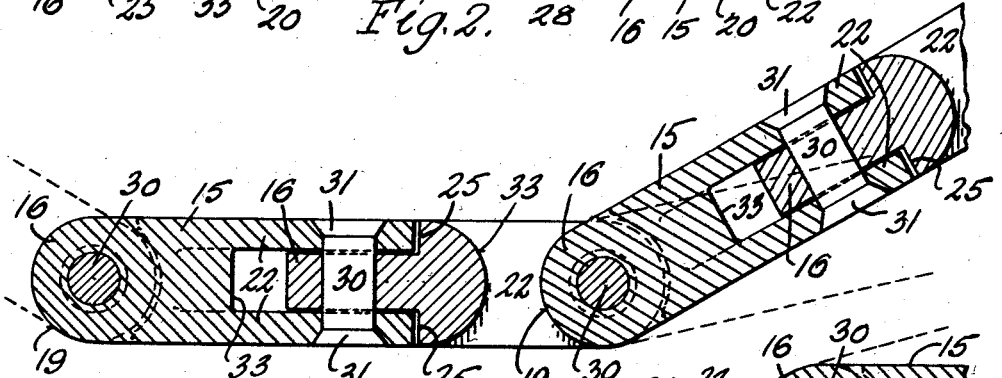
Fig. 3.
Fig. 4.
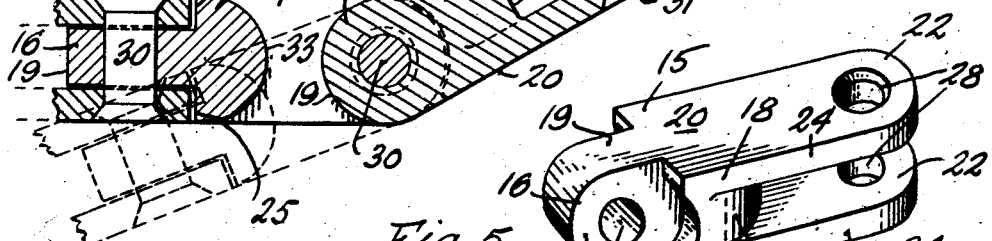
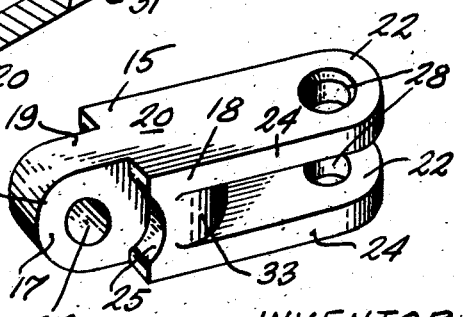
Fig. 5.
INVENTOR:
Ralph E. Stork
by Parker, Rockwell & Farmer
ATTORNEYS.

Oct. 6, 1942.  R. E. STORK  2,297,813
CHAIN
Filed July 7, 1939  2 Sheets-Sheet 2

INVENTOR.
Ralph E. Stork
By Parker, Brockwon & Farmer
ATTORNEYS.

Patented Oct. 6, 1942

2,297,813

UNITED STATES PATENT OFFICE 2,297,813

CHAIN

Ralph E. Stork, Hohokus, N. J., assignor to R. G. Wright & Company, Inc., Buffalo, N. Y.

Application July 7, 1939, Serial No. 283,241

4 Claims. (Cl. 198—189)

This invention relates to chains of the kind which are formed of links pivotally connected to each other.

One of the objects of this invention is to provide a chain link of improved construction which is so formed that when assembled with similar links to form a drag chain, it may slide on any one of its four sides. Another object of this invention is to provide a chain which is so constructed that all four sides thereof are smooth and free from projecting edges so that when the chain is used in connection with a conveyor, it may slide under the load when the load is held against movement. A further object is to provide a chain of this kind in which all of the links are of the same shape, and which is substantially square in cross section, and in which the links are connected by means of pivot pins in such a manner that adjacent pins extend at right angles to each other, so that the chain may be flexed in any direction. A further object is to provide a chain of this kind which may be driven in either of two directly opposite directions, so that the chain could be pushed in its guide.

Another object of this invention is to provide a chain which is so constructed that the pivot pins thereof may be provided with extensions which serve to confine the chain in a runway or guide therefor.

Other objects of this invention will appear from the following description and claims.

In the accompanying drawings:

Figs. 1 and 2 are respectively a top plan view and an elevation of a portion of a chain embodying this invention.

Fig. 3 is a longitudinal central sectional view of the portion of the chain shown in Fig. 1, on line 3—3, Fig. 1, but showing the links in different angular relations to each other than in Fig. 1.

Fig. 4 is a longitudinal central sectional view thereof, on line 4—4, Fig. 2, but showing the links in different pivotal relations to each other.

Fig. 5 is a perspective view of a chain link embodying this invention.

Figure 6:
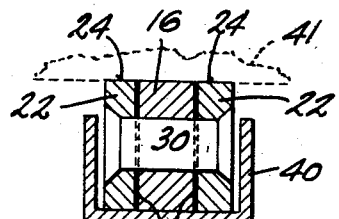
Fig. 6 is a transverse sectional view of the improved chain showing the same used as a conveyor chain in a guide therefor.

The chain embodying this invention is so formed that all of the links thereof may be identical, for the purpose of enabling the chain to be produced economically and to facilitate replacement of links in the chain, if necessary. It will be understood, however, that while it is preferred to construct the chain in such a manner that all of the links are identical, it is not intended to limit this invention to such construction, since obviously this invention is applicable to chains in which the links are not all alike. The chain is also illustrated specifically for use in connection with conveyors, but it is not intended to restrict this chain to any particular use, since the chain may equally well be used for transmitting power or for other purposes.

The links of this chain are all provided with an intermediate or body portion 15, which is of rectangular cross section, being preferably approximately square in cross section. Each link is provided at one end thereof with an outwardly extending lug or tongue 16, which is preferably arranged midway between two opposite faces of the link, so that the side faces 17 of the lug or tongue are spaced from the opposite side walls 18 of the link. The edge 19 of the lug or tongue 16 has an outer end portion which is preferably approximately of semi-cylindrical form, and the ends of the semi-cylindrical end portion of the edge of the lug 16 preferably extend substantially tangentially and preferably lie approximately in the planes of the two opposite side faces 20 of the link, so that the edges of the intermediate lug 16 form continuations of the flat side faces 20 of the link.

The other end of the link is provided with a pair of lugs or projections 22, which are spaced apart to form between them an inwardly extending slot or space. The two side lugs 22, consequently, form a bifurcated part of this end of the link and preferably the outer faces of the lugs 22 form continuations of the opposite flat sides 20 of the link. These faces of the side lugs 22 lie in planes which extend at approximately a right angle to the planes in which the opposite side faces 17 of the lugs or tongue 16 lie. The space or slot between the side lugs 22 is such that the tongue 16 of another similar link may enter into the slot or space between the side lugs 22. The edges 24 of the side lugs 22 preferably lie in the same plane or form continuations of the opposite sides 18 of the link and the outer portions of the edges of the side lugs 22 are preferably also approximately semi-cylindrical.

Preferably the body portion 15 of the link is provided at opposite sides of the tongue or lug 16 with recesses or depressions 25 into which the semi-cylindrical outer edge portions of the side lugs 22 of an adjacent link may enter. By means of this construction, the flat faces of the links are extended so that the crevices or gaps between links are greatly reduced. This greatly reduces the chance of parts of the packages or other articles to enter the crevices or gaps and thus to be damaged or positively carried with the chain when only a slidable or friction engagement with the chain is desired.

Any suitable or desired means may be provided for forming pivotal connections between adjacent links. In the particular construction illustrated, pivot pins are provided for this purpose, and consequently, the tongue or lug 16 is provided with a transversely extending aperture or hole 27 extending from one side face 17 of the lug or tongue to the opposite side face thereof. Similarly the side lugs 22 are provided with holes or apertures 28 extending perpendicularly to the opposite side walls 20 of the link. Preferably the holes in the intermediate and side lugs are concentric with the outer semi-cylindrical faces of these lugs. Since the hole 27 in the tongue or lug 16 extends parallel to the side faces 20 of the link and the holes 28 in the side lugs extend perpendicular to the side faces 20 of the link, it will be necessary in order to connect adjacent links, that alternate links be turned through approximately a right angle relatively to each other about the longitudinal axes of the links in order that the lug or tongue 16 of one link may enter into the slot between a pair of side lugs 22 of another link.

Any suitable or desired pivot pins 30 may be employed, and in the construction shown in Figs. 1 to 6, the ends of these pins preferably lie in the planes of the opposite side walls 20 of the links. For this purpose, the ends of the pivot pins may be provided with outwardly flaring heads 31 arranged in counter-sunk or outwardly flaring ends of the holes 28 of the side lugs 22. It will also be noted that the pivot pins at opposite ends of each link are arranged with their axes extending at approximately a right angle to each other. As a result of this construction, it will be noted that each link may pivot or swing only in one plane relatively to a link connected to one end thereof, and can only swing in a plane at right angles to the first mentioned plane with relation to a link connected to the other end thereof. This arrangement has the advantage that each link has an extended bearing surface with its pivot pin and such extended bearing surface, of course, results in much longer life of the pivotal connections than in such cases where the pivotal connections contact only along points or lines. Since, however, the alternate pivot pins extend in different directions, for example, at right angles to each other, as in the construction illustrated, it will be obvious that the chain may be flexed in any desired direction.

If it is desired to employ this chain in connection with sprocket or toothed wheels, recesses in the chain into which the sprocket teeth may enter can conveniently be formed in the recesses or slots between the side lugs 22. In the construction shown for this purpose, the inner ends of the slots or spaces between the side lugs 22 preferably terminate in an end wall 33, which may be of any suitable shape to cooperate with a tooth of a sprocket wheel, the end walls 33 shown in the drawings being approximately semi-cylindrical in form, and consequently, have a tooth engaging face similar to the curved or semi-cylindrical portion of the edge of the lug or tongue 16. By making these surfaces semi-cylindrical, the space between the end wall 33 of a link and the semi-cylindrical outer edge of the lug or tongue 16 of an adjacent link will always be equal during the swinging of the links relatively to each other. The teeth of a sprocket wheel may enter these recesses from either end thereof. If desired, however, the tooth engaging faces of the links may be of other shape or contour. It will also be noted that the spaces in the chain into which the sprocket teeth may fit are arranged alternately at different sides of the chain. Consequently, a sprocket wheel may engage any of the four sides of this improved chain.

In the use of this chain in connection with a conveyor, the chain may, if desired, operate within a guide channel 40 in such a manner that one face of the chain operates along the bottom of the channel, while the opposite face of the chain supports a load 41. Since the four faces of the chain are all alike, it will be obvious that the chain may be turned into any one of four positions relative to the guide channel 40. Consequently, if a face of the chain becomes worn by contact with the guide channel or with the load 41, the chain may be turned about its axis, so that another face thereof may replace the worn face.

Figure 7:
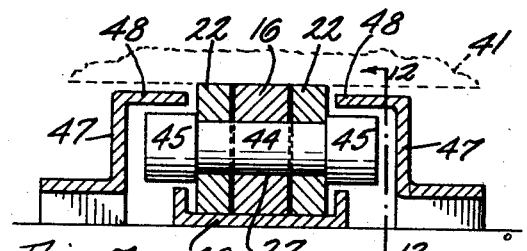
Fig. 7 is a transverse sectional view thereof, showing the same provided with pivot members of modified construction and arranged in a portion of the conveyor.
Figure 12:
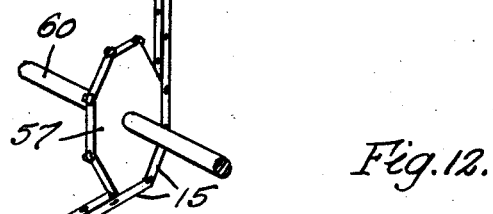
Fig. 12 is a longitudinal sectional elevation of a portion of a conveyor provided with said improved chain, the section being taken approximately on line 12—12, Fig. 7, on a reduced scale.
Figure 12:
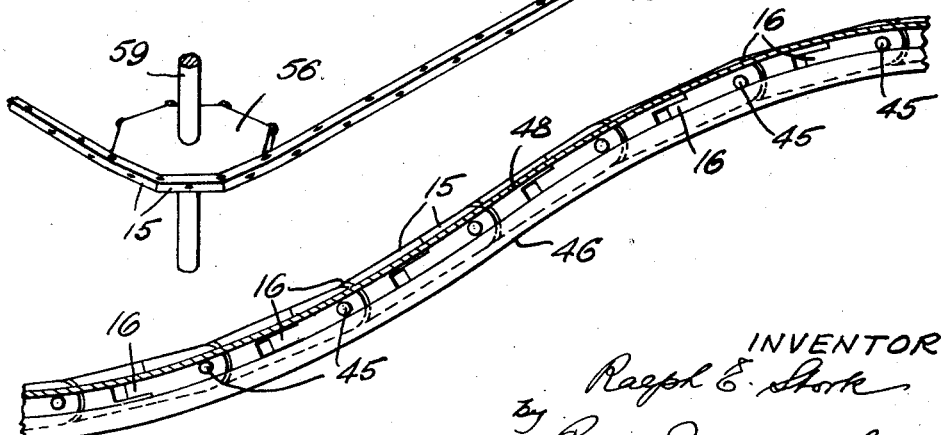

Any of the pivot pins 30 of the chain may, of course, be replaced by pivot members of other form, and in the construction illustrated in Fig. 7, there is shown a chain in which every other pivot pin 44 is provided with heads 45 at opposite ends thereof which extend outwardly beyond the sides of the chain. In Figs. 7 and 12, this chain operates in a shallow trough 46 and retaining bars 47 may be employed which have flanges 48 extending over the outwardly extending heads 45 of the pivot pins 44. This construction is very desirable in case the chain is used in a conveyor having an incline, such as shown in Fig. 12, and in which a pull on the chain might tend to straighten the portion of the chain on the incline, so that this portion thereof would be lifted out of the guide trough 46. The flanges 48 prevent the lifting of any part of the chain out of its trough.

The heads 45 of the pivot pins 44 may also be used for engaging in suitable recesses in sprocket wheels for driving the chain. When this type of drive is employed, the slots in the ends of the links between the side lugs need not extend so deeply into the links, or if desired, both means for driving the chain may be employed.

Figure 9:
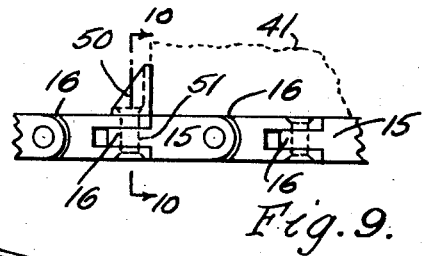
Fig. 9 is a fragmentary longitudinal view of a portion of said improved chain, with another modified form of pivot pin.
Figure 10:
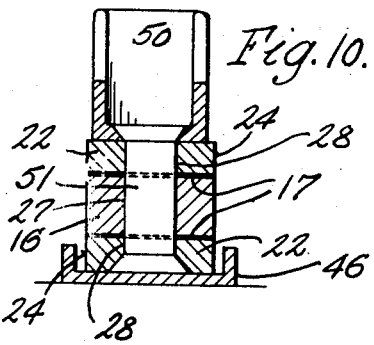
Fig. 10 is a transverse section thereof, approximately on line 10—10, Fig. 9, and on an enlarged scale.

In the construction shown in Figs. 9 and 10, some of the pivot pins may be provided with suitable projections of any kind for positively engaging the load 41. For example, as shown in these figures, a load engaging projection or bracket 50 of any suitable or desired form may be provided, having an aperture registering with the apertures 28 of a link of a chain and a pivot pin 51 may be provided of sufficient length to secure the load engaging projections 50 to a link of a chain. In place of the bracket 50, it is, of course, also possible to provide the upper ends of some of the pivot pins with enlarged heads which may extend upwardly to a sufficient extent to engage the load for positively moving the same along the conveyor. Any other means for providing load engaging parts or projections on the chain may, of course, be provided, if desired. It will be noted that this may be accomplished by using the same links as described in connection with Figs. 1 to 6, thus reducing the cost of providing special chains for special purposes.

Figure 8:
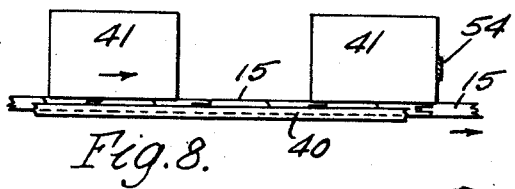
Fig. 8 is a fragmentary longitudinal view of a portion of a conveyor provided with a chain embodying this invention.

By making the chain approximately square in cross section, and by having the outer surfaces plain and uninterrupted to the greatest extent possible, comparatively smooth longitudinal surfaces are formed on the four sides of the chain so that any of the sides or faces of the chain will operate smoothly along its guide channel and also the chain may be used in connection with a stop or retaining member 54 for the load, as shown in Fig. 8, which may extend crosswise of the conveyor so that articles may be held in contact with the stop or retaining member 54 until they are removed from the conveyor. When used in this manner, the chain herein described will readily pass under the load 41 without excessive friction and undue wear thereon.

Figure 11:
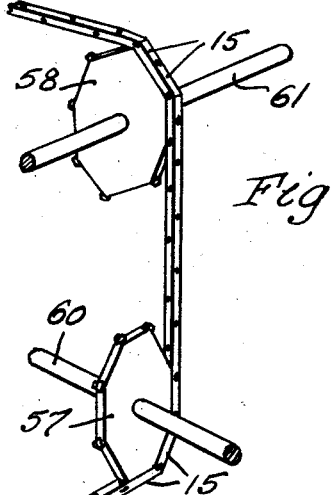
Fig. 11 is a diagrammatic perspective view showing a portion of the improved chain co-operating with sprocket wheels arranged at different angles.

In Fig. 11, there is shown by way of illustration, a diagrammatic view showing a chain of the type described cooperating with three sprocket wheels 56, 57 and 58 having shafts 59, 60 and 61 respectively, all of which extend in different directions. As has been stated, the sprocket wheels may engage any one of the four faces of the chain and the chain may be guided around sharp bends by means of sprocket wheels of relatively small diameter. The chain, therefore, is readily adaptable to many different operating conditions, regardless of whether the same is used as a conveyor chain for transmission of power, or for any other purposes.

The chain described has the further advantage that it may be pushed along a guideway or trough, which may be desirable or necessary at times. This is accomplished by the fact that the pivotal bearings connecting the chain links form equally good bearings when the links are pushed one against another as they do when a pull is exerted on the chain, and there is very little lost motion or play in the pivotal bearings.

It will also be noted that the construction of the chain is such that the spaces between the teeth of the sprocket wheels engaging the chain are preferably flat for a distance somewhat greater than the length of any link, as may best be seen by reference to Figs. 3 and 4. This is due to the fact that only every other pivotal connection of the chain permits the same to flex in the plane of the sprocket wheel. By providing flat surfaces on the sprocket wheels between teeth, a considerable portion of the driving force results from the provision of these flat faces, so that proportionally less driving force is transmitted through the teeth.

I claim as my invention:

1. A chain comprising a plurality of similar links and being approximately square in transverse section, each of said links being provided at one end thereof with a substantially centrally disposed longitudinally inwardly extending slot and at the other end thereof with a centrally disposed longitudinally outwardly extending tongue, said tongue and said slot being disposed about the longitudinal axis of said link substantially at right angles to each other, the slot of one link being adapted to receive the tongue of an adjacent link when the adjacent link is turned through substantially a right angle about its longitudinal axis relatively to said first link, and means for pivotally connecting said tongue in said slot, the inner portion of said slot providing a recess in which a sprocket tooth may engage, the outer edge portion of said tongue being substantially semi-cylindrical and the inner edge of said slot also having a substantially semi-cylindrical convex face, whereby a sprocket tooth entering into said slot bears against said semi-cylindrical surfaces.

2. A sprocket conveyor chain flexible in two planes perpendicular to each other and having four flat faces on any of which the chain may slide on a surface, all of the links of said chain being identical, each link having a body portion of substantially rectangular cross section provided with a pair of parallel side members with flat outer faces, which form extensions of two opposite sides of said body portion, said side members extending toward one end of the link and being spaced apart to form between them a slot shaped to receive and cooperate with a sprocket tooth, said body portion having a centrally disposed tongue extending lengthwise at the other end of said link beyond said side members and having flat faces arranged substantially at a right angle to the flat outer faces of said side members and adapted to extend partly into the slot of an adjacent link, means for pivotally securing the tongue of one link between the side members of one adjacent link, the end of said tongue being formed for engagement with a sprocket tooth in said slot, alternate links of said chain being turned through a substantial right angle about the longitudinal center of the chain, the slots of the links extending to opposite sides of the chain to receive sprocket teeth from any one of the four sides of said chain.

3. A sprocket conveyor chain flexible in two planes perpendicular to each other and having four flat faces on any of which the chain may slide on a surface, all of the links of said chain being identical, each link having a body portion of substantially rectangular cross section formed integral with a pair of parallel side members with flat outer faces which extend in the planes of two opposite sides of the body portion, said side members extending toward one end of said link and being spaced apart to form between them a slot shaped to receive and cooperate with a sprocket tooth, said body portion also having an integral tongue extending outwardly toward the other end of said link and having side faces arranged in planes extending substantially perpendicular to the flat outer faces of said side members and being formed to enter into the slot between two side members of a similar link, the end of said tongue being spaced from the body portion of an adjacent link to form therewith a space into which a sprocket tooth may enter from either of two opposite directions, the alternate links of the chain being turned through approximately a right angle about the longitudinal center of the chain to form a chain with which a sprocket wheel may engage at any of the four sides of the chain, and pivot pins extending through the outer portions of said side members of one link and a tongue of an adjacent link for forming a pivotal connection between adjacent links and for locating the tongue relatively to said side members to form a space for a sprocket tooth.

4. A chain for use in a trough having an overhanging part, comprising a plurality of similar links each having two opposite side faces extending substantially throughout the length thereof, a slot extending lengthwise of said link from one end thereof between said side faces, a tongue extending outwardly lengthwise from the other end of said link and having flat faces arranged substantially at a right angle to said side faces of said link, and adapted to extend into the slot of a similar adjacent link when turned about its axis into a position at about a right angle to the adjacent link, pivot pins connecting the tongues and the slotted portions of said links and extending alternately in directions at substantially right angles to each other, at least some of said pins, extending in one direction, having enlarged substantially cylindrical heads extending beyond said side faces of said links, for engagement with said overhanging part of said trough for holding the chain in its desired path.

RALPH E. STORK.